US008108766B2

(12) United States Patent
Meunier

(10) Patent No.: US 8,108,766 B2
(45) Date of Patent: Jan. 31, 2012

(54) XPATH-BASED DISPLAY OF A PAGINATED XML DOCUMENT

(75) Inventor: Jean-Luc Meunier, St. Nazaire les Eymes (FR)

(73) Assignee: Xerox Corporation, Norwalk, CT (US)

( * ) Notice: Subject to any disclaimer, the term of this patent is extended or adjusted under 35 U.S.C. 154(b) by 467 days.

(21) Appl. No.: 12/408,290

(22) Filed: Mar. 20, 2009

(65) Prior Publication Data

US 2010/0241950 A1    Sep. 23, 2010

(51) Int. Cl.
*G06F 17/00* (2006.01)
(52) U.S. Cl. .......................... 715/236; 715/249; 715/273
(58) Field of Classification Search .................. 715/249, 715/273, 236
See application file for complete search history.

(56) References Cited

U.S. PATENT DOCUMENTS

| | | | | |
|---|---|---|---|---|
| 2001/0032218 | A1* | 10/2001 | Huang | 707/513 |
| 2002/0147748 | A1* | 10/2002 | Huang et al. | 707/517 |
| 2003/0120686 | A1* | 6/2003 | Kim et al. | 707/200 |
| 2004/0117769 | A1* | 6/2004 | Lauzon et al. | 717/125 |
| 2008/0201328 | A1* | 8/2008 | Da Silva et al. | 707/6 |

OTHER PUBLICATIONS

Dejean, Herve &Jean-Luc Meunier; "A System for Converting PDF Documents into Structured XML Format";2006; 7th IAR Workshop on Document Analysis Systems.*
http://www.w3.org/TR/XPath, downloaded Feb. 23, 2009, copyright 1993.
http://www.w3.org/TR/REC-CSS2/cover.html, downloaded Feb. 23, 2009, dated Apr. 11, 2008.

* cited by examiner

*Primary Examiner* — Stephen Hong
*Assistant Examiner* — Asher Kells
(74) *Attorney, Agent, or Firm* — Fay Sharpe LLP

(57) ABSTRACT

A computer-implemented method, device, and computer readable medium transform a markup language document from a digital form to a user-specified form on a display device. Based on a configuration file, a digital markup language document is processed. For a current navigated-to page in the markup language document, context is set to a page node, and a page transformation is performed by the computer. A selection language expression is evaluated, and a node transformation is performed. The node transformation may include setting context, determining the type of decoration associated with the current context, reading the selection language expressions, computing a decoration parameter value for each of the decoration parameters associated with each declaration, and creating and displaying a decoration based on the computed decoration parameter values. The steps may be repeated for remaining markup language node and for each remaining decoration declaration.

25 Claims, 8 Drawing Sheets

XPATH-BASED DISPLAY OF A PAGINATED XML DOCUMENT

BACKGROUND

The exemplary embodiment relates to document processing. It finds particular application as an apparatus or method for representing context and underlying document structure in a common output for a user to review. The Extensible Markup Language (XML) is a widely used extensible language which aids information systems in sharing structured data, encoding documents, and serializing data. XML is not only useful in creating web pages, but also makes it possible to define the content of a document separately from its formatting, facilitating the reuse of that content in other applications or environments. XML provides a basic syntax for sharing information between different computers, different applications, and different organizations without needing to pass through many layers of conversion.

One type of XML document of particular interest herein is a paginated XML document. The phrase paginated XML document is used because the XML data of this type of document reflects the layout of each page of the document. This XML data structure is common in the document management and processing domain either as an initial, intermediary or final structure. For instance, most, if not all, optical character recognition (OCR) engines offer such an output format. Additionally, many document converters offer XML as either an input or output format, such as, e.g., the well known open source pdf2xml converter which converts information contained in an Adobe® PDF file into an XML document.

Paginated XML documents typically conform to the schema shown in Table 1, as expressed in compact Relax NG. Relax NG (REgular LAnguage for XML Next Generation) is a well known schema language for XML documents.

TABLE 1

```
namespace a = "http://relaxng.org/ns/compatibility/annotations/1.0"
start =
  element DOCUMENT {
    element PAGE {
      attribute number { xsd:positiveInteger }
    }+
  }
```

It is often desirable to display the content of paginated XML documents in a human-friendly manner for various purposes such as when designing a conversion chain (e.g., reviewing the input, intermediary and output documents), when performing some quality assurance (QA) on a document collection, and the like. An XML excerpt produced by the pdf2xml converter is shown in Table 2 below to illustrate the need for a more human-friendly manner of displaying the content of an XML document. Note that Table 2 only shows a portion of the document, and it can be readily appreciated, the difficulty that a person would encounter in navigating through the virtual sea of esoteric attributes.

TABLE 2

```
<?xml version="1.0" encoding="UTF-8"?>
<DOCUMENT><METADATA><PDFFILENAME>05_.pdf</PDFFILENAME><PROCESS
name="pdftoxml" cmd="-noImage "><VERSION
value="1.2"><COMMENT/></VERSION><CREATIONDATE>Thu Jun 26 11:41:48 2008
</CREATIONDATE></PROCESS></METADATA><PAGE width="595" height="842" number="1"
id="p1"><TEXT width="125.5" height="13.284" x="235" y="57.208" id="p1_t1"><TOKEN sid="p1_s5"
id="p1_w1" font-name="TimesNewRomanPSMT" bold="no" italic="no" font-size="12" font-
color="#000000" rotation="0" angle="0" x="235" y="57.208" base="67.9" width="37.296"
height="13.284">Server</TOKEN><TOKEN sid="p1_s6" id="p1_w2" font-
name="timesnewromanpsmt" bold="no" italic="no" font-size="12" font-color="#000000" rotation="0"
angle="0" x="275.4" y="57.208" base="67.9" width="57.992"
height="13.284">d'Archiving</TOKEN><TOKEN sid="p1_s7" id="p1_w3" font-
name="timesnewromanpsmt" bold="no" italic="no" fontsize=" 12" font-color="#000000" rotation="0"
angle="0" x="336.5" y="57.208" base="67.9" width="24" height="13.284">2007</TOKEN></TEXT>
... ...
```

With reference to FIG. 1, an alternate view of the same XML document shown in Table 2 is shown as it might be displayed or printed. A first page 10 is shown, with two paragraphs 12, 14 shown on the page. This alternate view is useful to a user needing to see the final form of the exemplary XML document. However, the underlying details of the XML document, as shown in Table 2, are not visible or apparent in the view shown in the figure. Users having a need to view both the final form of the document, and the underlying details associated with features of the final form of the document will have difficulty associating the details of Table 2 to the corresponding features of the document in its final form as shown in FIG. 1. Further, other users may have a need to view only selected features or components of the document.

As demonstrated above, the interests of users examining the contents of an XML document vary, and the problems associated with viewing the XML document in its raw native form can be better understood by examining a few of these user needs. For example, one user may have a need to view elements with a certain attribute such as, e.g., the @Page-Number attribute of any TOKEN element, while another user may instead have a need to view any TOKEN element followed by a FIGURE element.

Further, the XML document structure to be viewed may vary. For instance, one user may wish to adapt the view to a different input XML where an element such as, e.g., <Page-Number> would replace the attribute @PageNumber in the previous example. Another user may need to visualize the XML output of a particular OCR engine.

Yet another problem arises from a need to navigate through a document, visiting only particular nodes such as chapter headings, subheadings, page nodes, and the like. In fact, users are commonly interested in only certain nodes. Visiting only those specific nodes can be tedious without the appropriate support.

One existing solution consists of modifying the source code of an XML visualizer to meet a particular requirement. However, it can be readily appreciated that this is a cumbersome and time consuming solution. Further, it is a solution that requires a particular skill set which many users may not have.

The present application provides a new and improved apparatus and method which overcome the above-discussed problems and others.

BRIEF DESCRIPTION

In one aspect, a computer-implemented method for transforming a markup language document from a digital form to a user-specified form on a display device is provided. Stored decoration declarations are accessed, with each declaration identifying at least one type of markup language document node. Each declaration includes decoration parameters, and at least one selection language expression associated with the markup language document node. At least a portion of the document content is displayed with nodes decorated as specified in the selected ones of the stored decoration declarations.

In another aspect, a computer program product is provided. The computer program product stores instructions which, when executed by a computer, cause the computer to perform the computer-implemented method for transforming a markup language document from a digital form to a user-specified form on a display device.

In another aspect, a computing device is provided for transforming a markup language document from a digital form to a displayed form on a display device, the computing device includes a system memory for storing a visualizer program. The visualizer program includes a configuration processing component, a markup language document access component, a navigation component, a context component, a selection markup language evaluation component, and a decoration display component. The computing device also includes a processor for controlling operation of the visualizer program, storage for accessing the visualizer program and/or a communication interface for accessing the visualizer program. The visualizer program, when stored in the system memory, is configured to perform a markup language transformation process. The process includes accessing decoration declarations, with each declaration identifying at least one type of markup language document node. Each declaration includes decoration parameters, and at least one selection language expression associated with the markup language document node. At least a portion of the document content is displayed with nodes decorated as specified in the stored decoration declarations.

DETAILED DESCRIPTION

Figure 1:
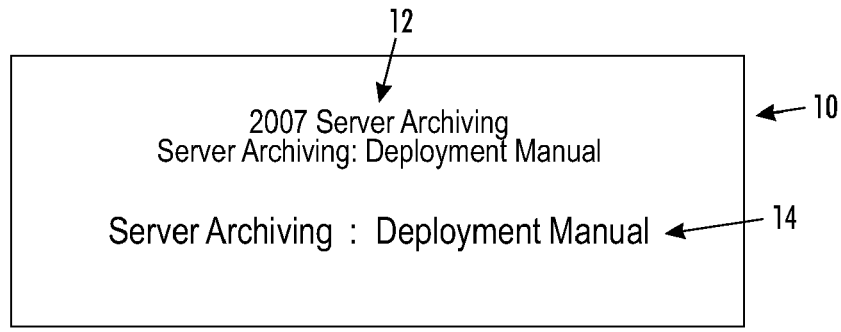
FIG. 1 is an exemplary conventional visualization of a digital XML document.

XPath is an XML selection language specified by the World Wide Web Consortium W3C (see, e.g. http://www.w3.org/TR/xpath.html and http://www.w3.org/TR/xpath20). While the embodiments described herein can utilize any known or envisioned XML selection language, the embodiments are described with particular reference to XPath as the markup language selection language (hereinafter "selection language") because it is a useful tool for navigating elements and attributes in an XML document. A brief introduction to XPath is provided, however, for the benefit of readers unfamiliar with the XPath selection language to facilitate a better understanding of the embodiments. There are presently two versions of XPath, i.e., XPath 1.0 and XPath 2.0. XPath 2.0 is a superset of XPath 1.0, with the added capability to support a richer set of data types, and to take advantage of the type information that becomes available when documents are validated using XML Schema. However, a backwards compatibility mode is provided to ensure that nearly all XPath 1.0 expressions continue to deliver the same result with XPath 2.0. Further, while the present application is described with reference to XPath 1.0, as mentioned above, aspects of the present application are not limited in this respect, and the embodiments may utilize any current or future version of XPath as well as any known or envisioned XML selection language.

XPath can be described as a node-tree data model and path expression language for selecting data within XML documents. XPath also includes a useful function library. XPath makes it possible to refer to individual parts of an XML document. XPath expressions can refer to all or part of the text, data and values in XML elements, attributes, processing instructions, comments, and the like. Various terms are used herein with reference to XML documents and XPath. A brief definition is therefore provided for the terms discussed herein. XML is a tree-like data structure for a document, wherein XML nodes refer to the junction of branches of the tree-like structure. The document node of an XML document refers to the entire document. It is the XML root node of the XML tree.

Another XML node type is the element node which represents an element in an XML document. Elements may contain children such as attributes, other elements, or text. If an element contains text, the text is represented in a text node, and referred to herein as a text token. An entity, however, is a symbolic representation of information. For example, if a user desires to create a message that is included in every single memo that the user writes, rather than type a lengthy message for every memo, the text of the message can be represented by an entity symbol. The user then only needs to assign an arbitrary entity symbol to the message once, and thereafter refer to the entity symbol to make use of the assigned message whenever creating a memo.

Among the useful features of XPath are XPath expressions. An XPath expression can, e.g., either select a set of nodes or return a scalar value. An XPath expression such as, e.g., /A/B simply selects all the B elements under the A element which must be the XML root. An XPath expression can thus be seen as a trajectory or path in the XML tree. This path can not only move down the tree along the children direction as in the previous example, but also following other so-called axes, e.g., up along the parent axis or horizontally along the sibling axis. For instance, the expression /A/B/following-sibling::C will select any node C whose previous sibling is a node B under the node A which is the tree root.

With XPath expressions, it is also possible to specify conditions such as the various types of exemplary conditions shown in Table 3 below.

TABLE 3

/A/B[3] denotes the 3rd B below A which is the tree root
/A/B[@foo] denotes all Bs with a foo attribute under A which is the tree root
/A/B[<expression>] denotes all Bs which satisfy the given expression under A which is the tree root The conditions shown in Table 3 are only exemplary conditions shown to facilitate a better understanding of concepts of the present application. In general, XPath is a well-known standard, and its power and utility extends well beyond the conditions shown in the table. For example, an XPath expression can include a relative reference such as, e.g., ./@foo, to a specific node which is then called the XPath context. It is also possible to under-specify the depth of a move, e.g., I/A denotes any node A in the tree. Further, an XPath expression may compute a scalar value, e.g., count(//A) will return the count of all A nodes in the tree. Several basic functions are also available for Boolean, numeric, or string manipulation.

Visualizer Overview

A brief overview of concepts of the present application is first provided, followed by a detailed description. In the embodiments described herein, a configurable visualizer is provided by which a user (any person using the visualizer) can view XLM documents which have been transformed from the raw stored XML format to an enhanced presentation format based on the user's configuration of the visualizer. The configuration of the visualizer is effected by writing expressions for an XML selection language such as, e.g., XPath expressions.

In one embodiment, the visualizer offers a pre-defined library of graphical objects. These graphical objects can be used, e.g., for decorating the visualized XML document and will, therefore, be referred to herein as decoration types. The decoration types include, for example, text, bounding boxes such as rectangles, other polygons or irregular shapes, and lines, among others. In order to make use of these decoration types, the visualizer lets the user declare which decorations are to be used, together with a relative XPath expression for each decoration defining which nodes are to be subject to it. For instance, the user may request that the visualizer draw a rectangle for each TOKEN element on a page by declaring a decoration of type "rectangle" associated with an XPath expression such as, e.g., .//TOKEN. This XPath expression is evaluated in the context of the PAGE node currently being displayed by the visualizer. Given a page, the visualizer displays the declared decorations in superposition over the page. Also, given a decoration, it is possible to navigate in the document through certain decorations.

In some embodiments, the user is provided the ability to modify declared decorations and/or dynamically add new user-defined decorations. When adding new decorations the user may, e.g., provide a name and selection XPath, and may also choose a type of decoration. The modified and new decorations could operate similarly to the pre-defined decorations, however, depending on the chosen decoration type, additional XPath expressions may be requested by the system.

It is to be appreciated that while the visualizer is decorating XML nodes that have been selected by the user for viewing with graphical objects or other features such as highlighting, the underlying XML document structure remains unaltered, in its original form. Therefore, the integrity of the XML document is assured even though the user may be viewing the XML document with any number of selected decorations.

Figure 2:
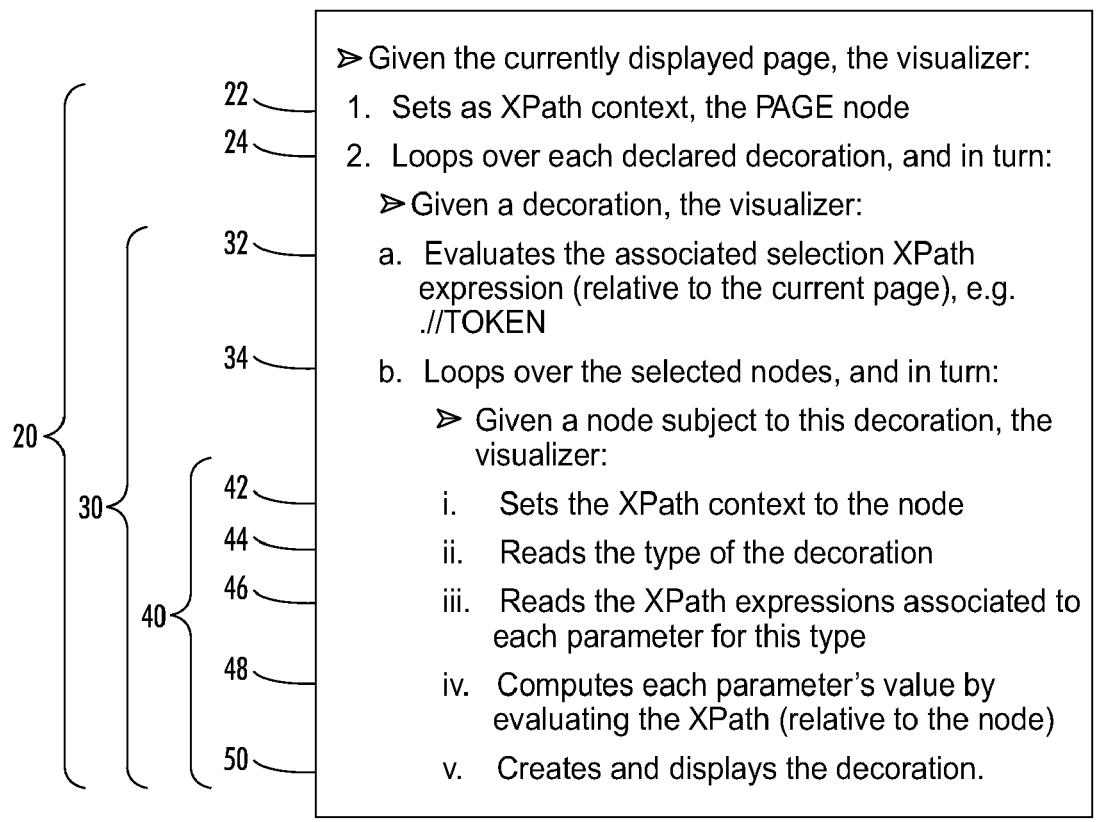
FIG. 2 is a summarization, in pseudo-code, of the procedure for decorating a page according to aspects of the present application.

With reference to FIG. 2, the overall procedure for decorating a page by the visualizer is shown in pseudo-code. Given a currently-displayed page, the visualizer performs a page transformation procedure 20. Within the page transformation procedure 20, the visualizer sets the PAGE node as the current XPath context (22). Because the evaluation of an XPath expression depends on the context against which the expression operates, any XPath expressions evaluated for the currently-displayed page will therefore be based on the current page and its associated environment, which includes, e.g.: the position of the context node in the document order, relative to its siblings; the size of the context; variable bindings with which references to a variable can be resolved; a function library; and the namespace declarations in scope for the expression.

After setting the XPath context, the visualizer iterates over each declared decoration (24) and performs a decoration procedure 30 for each decoration. Within the decoration procedure 30, the visualizer evaluates the associated selection XPath expression relative to the current page (32), i.e., based on the current XPath context, e.g. .//TOKEN. The visualizer then iterates over the selected nodes (34), and for each node, performs a node procedure 40.

As part of the node procedure 40, the visualizer: sets the XPath context to the current node (42); reads the type of the decoration (44), i.e., text, rectangle, etc.; reads the XPath expressions associated to each parameter for the current type of decoration (46); computes each parameter's value by evaluating the XPath expression relative to the current node (48); and finally creates and displays the decoration (50).

The above-mentioned procedures, i.e., the page transformation procedure 20, the decoration procedure 30, and the node procedure 40, and additional aspects of the present application are now described in further detail.

Pre-Defined Library of Decorations

To facilitate a flexible and extensible incorporation of decoration types into the visualizer, a pre-defined library of decorations is provided. The library may include various graphical objects, i.e., type of decorations. Exemplary decoration types are listed in Table 4 for illustration purposes only. Embodiments described herein are not limited with respect to decoration types. With these simple, but extensible, decoration types, it is possible to satisfy the needs a large number of visualization requirements of various users.

TABLE 4

| Text | Displays text on the page. The position, font, font size, color and other text effects, and the textual content can be parameterized; |
|---|---|
| Rectangle | Draws a rectangle on the page. Its position, size, line style, color, fill-style and other characteristics can be parameterized; |
| Text + Rectangle | Combines a text and a rectangle decoration; |
| Image | Inserts a specified image on the page at a specified position; |
| Line | Draws a line from a specified position to another on the page, with a specified line style; |

TABLE 4-continued

| | |
|---|---|
| Hyperlink | Draws a clickable and configurable rectangle that reflects a hyperlink, e.g., a user click instructs the visualizer to jump to the target node; and |
| Annotation | Draws a configurable rectangle that adds or removes an XML attribute upon a user click, with a visual feedback to the user. |

Declaration of the Decorations

According to aspects of the present application, an XML selection language, e.g., XPath, is used to identify the XML elements of an XML document that are subject to a decoration, and to specify the decoration parameters. Each decoration is declared by a series of XPath expressions. First is the selection of an XPath expression, e.g. .//TOKEN, which selects for a certain page, all the XML nodes subject to the current decoration. Second is the decoration type, e.g., "Rectangle", and third are the various parameters for the specified decoration type. For example, in the case of a rectangle, seven XPath expressions are used to declare seven parameters (element type, e.g., paragraph, x,y coordinates of one corner of the rectangle, height and width dimensions, line color, and fill style).

In some embodiments, the declaration is stored in a so-called ".ini" (INI) file format, which has become a widely used standard for configuration files in the art. INI files are simple text files with a basic structure. They are commonly associated with Microsoft® operating systems, but are also used on other operating systems and platforms. The name "INI file" is derived from the filename extension usually used, ".ini", that stands for "initialization". Sometimes, files using the INI file format will use a different extension, such as ".cfg", ".conf", or ".txt". A sample INI file declaration is provided in Table 5 to illustrate an exemplary way to display a rectangle for each PARAGRAPH node of a page, by declaring a decoration entitled "My_ParagraphRectangle". Note that the portions of each line to the right of the equal sign, "=", are XPath expressions. The XPath expressions could, of course, be replaced by alternate expressions in embodiments utilizing an alternate XML selection language. Titles for declarations in the INI configuration file such as My_ParagraphRectangle can be arbitrary and may be determined by the user. Normally, the user will assign titles that have a meaning to the user, and possibly other users. For instance, the title My_ParagraphRectangle is suggestive, by its name, as a rectangle decoration for paragraphs.

TABLE 5

[My_ParagraphRectangle]
type="Rectangle"
XPath_selection=.//PARAGRAPH
XPath_x=@x
XPath_y=@y
XPath_w=@width
XPath_h=@height
XPath_LineColor="BLUE"
XPath_FillStyle="Transparent"

Embodiments described herein anticipate INI configuration files having a [DEFAULT] section where the user can declare values by default. This is convenient since, e.g., some decoration types need the declaration of their x, y, width and height, while these expressions are often the same for all decorations given a certain XML input structure. So the [DEFAULT] section enables the user to declare them once, rather than every time, with declarations such as, e.g., XPath_x=@x. Now all decoration types that need to access the XML attribute@x to compute the x coordinate for parameter XPath_x can simply not define it (because of its presence in the DEFAULT section). In the example shown in Table 5, for example, the line corresponding to XPath_x could be omitted. In fact, the x, y, width and height definitions could all be advantageously moved to the DEFAULT section since they are very common across decoration types.

It is also to be appreciated that the INI file is provided as an exemplary method for declaring decorations, and alternate methods known in the art fall within the scope of the present application. For example, an XML format can be used, or a graphical user interface (GUI) can be used for entering the declarations.

Figure 3:
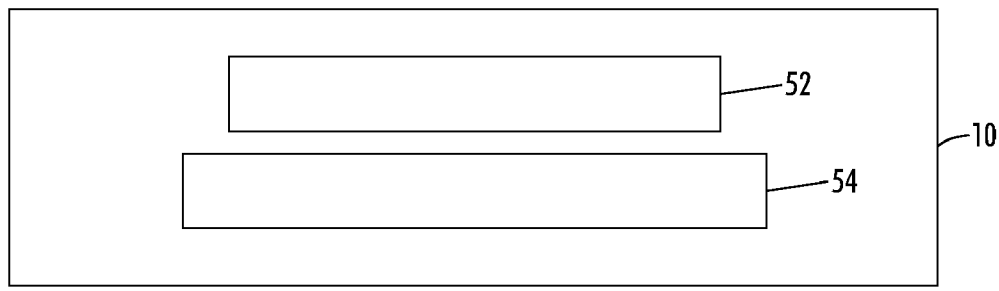
FIG. 3 shows exemplary decorations.

With reference now to FIG. 3, with continuing reference to FIG. 1 where like numerals represent like elements, the visual effect of the exemplary My_ParagraphRectangle declaration is shown. On the first document page 10, two rectangle decorations 52, 54 are shown in the locations of the paragraphs 12, 14 shown in FIG. 1. Note, however, that only the decorations are shown. To have the text shown as well, the rectangle decorations can be further decorated with the underlying XML document text, for instance, by making an additional declaration for the text as shown in Table 6. Again, note that the portions of each line to the right of the equal sign, "=", are XPath expressions.

TABLE 6

Figure 4:
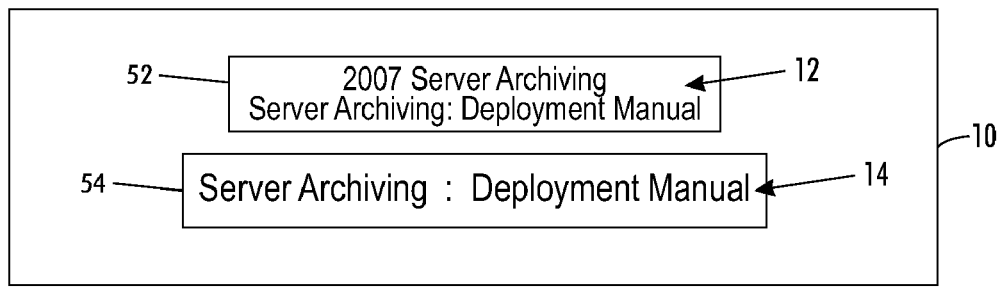
FIG. 4 shows exemplary decorations surrounding associated text tokens.

[My_TokenText]
type="Text"
XPath_selection=.//TOKEN
XPath_font_size=@font-size div 1.2
XPath_font_color=@font-color It may be observed that an adaptation to the text has been declared since the font size indicated in the XML file is divided by 1.2 to have an appropriate size in the visualizer, i.e., to make room for the rectangle decoration. An alternate adaptation could be made, for instance, by comparing the actual page height to the expected page height. This can be accomplished, e.g., by accessing the height attribute, assuming the PAGE node has such an attribute, of the PAGE node as follows: XPath_font_size=@font-size div 1000 div.//parent:: PAGE/@height. The visual effect of the additional text declaration shown in Table 6 is shown in FIG. 4. On the first document page 10, the two rectangle decorations 52, 54 now enclose the text of paragraphs 12, 14. The text font size has, however, been reduced by division by the specified factor of 1.2. However, as previously described, the content of the underlying XML document is unchanged by the decoration process.

Figure 5:
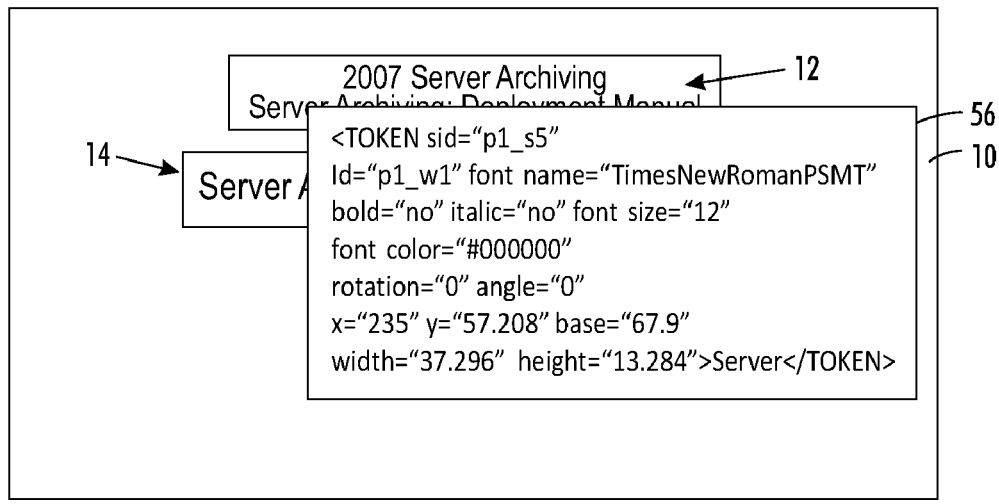
FIG. 5 shows an exemplary floating view window showing underlying XML language of a selected text.

With reference now to FIG. 5, an alternate decoration in the form of a details window 56 is shown. The details window 56 shows the underlying XML language for a selected element, such as a word or paragraph, of a viewed document. In the particular instance shown, the user has opted to view the underlying XML language for the first word of the overlaid paragraph 14. The details window 56 can be activated temporarily to view the XML language underlying a selected feature of the XML document by any means known in the art such as, e.g., right-clicking on a selected word or paragraph, selecting a window region by use dragging a pointing device over a region of the displayed document, etc. In the exemplary instance shown, the user has elected to view the underlying XML language for the first word "Server" of the overlaid paragraph 14. This feature provides the user with a user-friendly means for displaying an XML document in a humanreadable form, based on the underlying XML document content, and at the same time, provides the option of displaying portions of the underlying XML document content associated with a selected portion of the XML document.

Display of the Decorations

The display of a page occurs, as specified earlier, in the pseudo-code shown with reference to FIG. 2. It is based on the possibility in XPath, or alternate XML selection language, to indicate the context of evaluation of an expression. Before executing the selection in XPath, the context is set to the page node, and then in order to compute the parameters of each decoration, the context is set to each selected node in turn. For the My_ParagraphRectangle decoration previously illustrated, this amounts to setting the XPath context to the page node, and then selecting all relevant nodes by evaluating the XPath expression indicated in the decoration: .//PARAGRAPH. Note that there may be zero to any number of intermediary nodes between the PAGE node and the PARAGRAPH node because of the "//" in the XPath expression.

Each selected node is now processed in turn. The XPath context is set to the current node, and each parameter of the decoration is evaluated, e.g., @x, @y, and so forth. Assuming rectangle decorations have been declared as previously described, a rectangle decoration is drawn on the page at the determined position, and with the determined characteristics. It is noted that, in one embodiment, decorations are drawn in their order of declaration and then selection. For this reason, a later-declared decoration may overwrite a former. In alternative embodiments, layers are defined and each decoration is attached to a specified layer, e.g., via an XPath expression, such as: XPath_layer="1". It is to be appreciated that the language for definition of the layers, and attachment to the layers, may vary according to the particular XML selection language employed in the various embodiments.

Navigating Decoration-Wise

Given a decoration declared by the user, it is possible to define a general XPath expression allowing the visualizer to select the next (or previous) similar decoration in the document. It is also possible to enumerate all nodes in the documents subject to this decoration.

For example, assume that the name "$elect" represents the XPath selection expression associated with a specified decoration, e.g., .//TOKEN[@PageNum], which refers to any XML element named "TOKEN" that has an attribute named "PageNum". This could be, e.g., an XPath expression able to select nodes identified by a page number detector. To select all of the relevant nodes in the document, "//PAGE" can be concatenated with the XPath selection expression, e.g., "//PAGE/$elect", which is "//PAGE/.//TOKEN[@PageNum]".

It is possible to implement a jump to the next similar decoration by determining the page number of the next decoration as follows: "count(./following::PAGE[$elect][1]/preceding::PAGE)". Similarly, a jump to the previous similar decoration can be implemented by determining the page number of the previous decoration with: "count(./preceding::PAGE[$elect][1]/preceding::PAGE)".

Alternatively, it is possible to select the page using the preceding-sibling and following-sibling along the XPath sibling axis using, e.g., "./following-sibling::PAGE[$elect][1]".

Exemplary Page with Decorations

Figure 6:
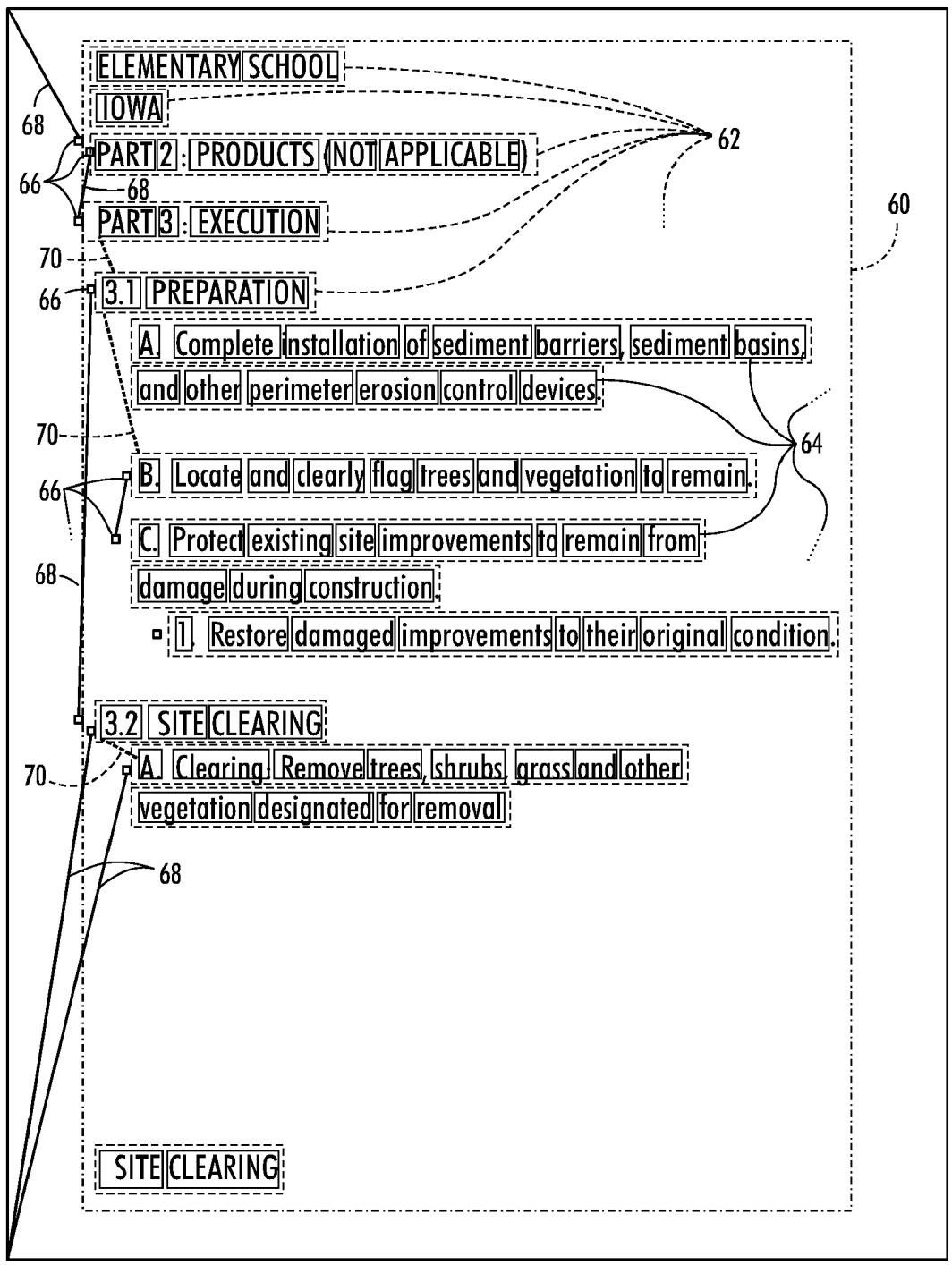
FIG. 6 is an exemplary page of an XML document showing some aspects of decorations provided by embodiments of the present application.

With reference now to FIG. 6, an exemplary visualized page of an XML document is shown which includes, non-inclusively, various aspects of the decorations provided by embodiments described herein. For example, a column decoration 60, is represented by a first decoration: a rectangle (dash-dot line) which encompasses all of the text in this case because the document is a single-column document. In other words, the column decoration 60 reflects a COLUMN node denoting the notion of column.

In addition to the column decoration, also shown are line decorations 62 which are shown as dashed rectangles denoting LINE nodes, i.e., lines of text in the document. Similarly, the solid rectangles surrounding each word in the document denote WORD nodes 64. Of course, as previously described, the corresponding XPath expressions include declarations for the text similar to those previously shown in Table 6.

Also shown in FIG. 6 are navigation features to facilitate decoration-wise navigation of the document. For example, links 66 represented by small squares to the left of the lines reflect links to previous and next items detected by a sequence detector component of the visualizer. This is an example of active decoration that lets the user easily jump to the previous or next item in a sequence. Sibling relationship indicators 68 are represented by solid lines connecting the links 66 based on their sibling relationship. The relationship indicators 68 which link to an off-page link are directed to a top corner or a bottom corner of this exemplary page to indicate a link to either a previous page or a succeeding page. Similar to the relationship indicators 68, nesting indicators 70 are represented by dashed lines connecting the links 66 based on their nested relationship to each other as shown on the page.

It is to be appreciated that the decorations and navigation features shown in FIG. 6 are exemplary only and are not limited to the form shown. For example, rather than distinguishing decorations by the use of various line styles, e.g., dashed vs. solid, decorations may be distinguished by different colors or by various types of text highlighting as known in the art. Further, the embodiments described herein are flexible, and the choice of decorations shown, and the style of the decorations shown can be user-selected or user-specified in some embodiments. Further, using a flexible XML selection language such as XPath to parameterize the decorations allows the use of either static or dynamic expressions. For example, XPath lets the user specify both static values, e.g., "BLUE", and dynamic values, e.g., @font-color. In one embodiment, the type of a decoration is not an XPath expression but rather a string value. Alternative embodiments may utilize an XPath constant, e.g., "Rectangle".

Although FIG. 6 is intended to provide an understanding of the present application, decoration-wise and navigation-wise, the embodiments discussed herein have the capability, in addition to the display of text and images (or their bounding box alone), to show additional decorations beyond those shown. For example, the embodiments can display, among others: various grouping elements such as, e.g., column, paragraph, line, as well as text and image bounding boxes; the page reading order; annotation of certain nodes by use of an "ActionableRectangle" decoration type; headers and/or footers; page numbers; table of content (TOC) entries as hyperlinks; sequences items; and others.

Decoration and Navigation Techniques

Figure 7:
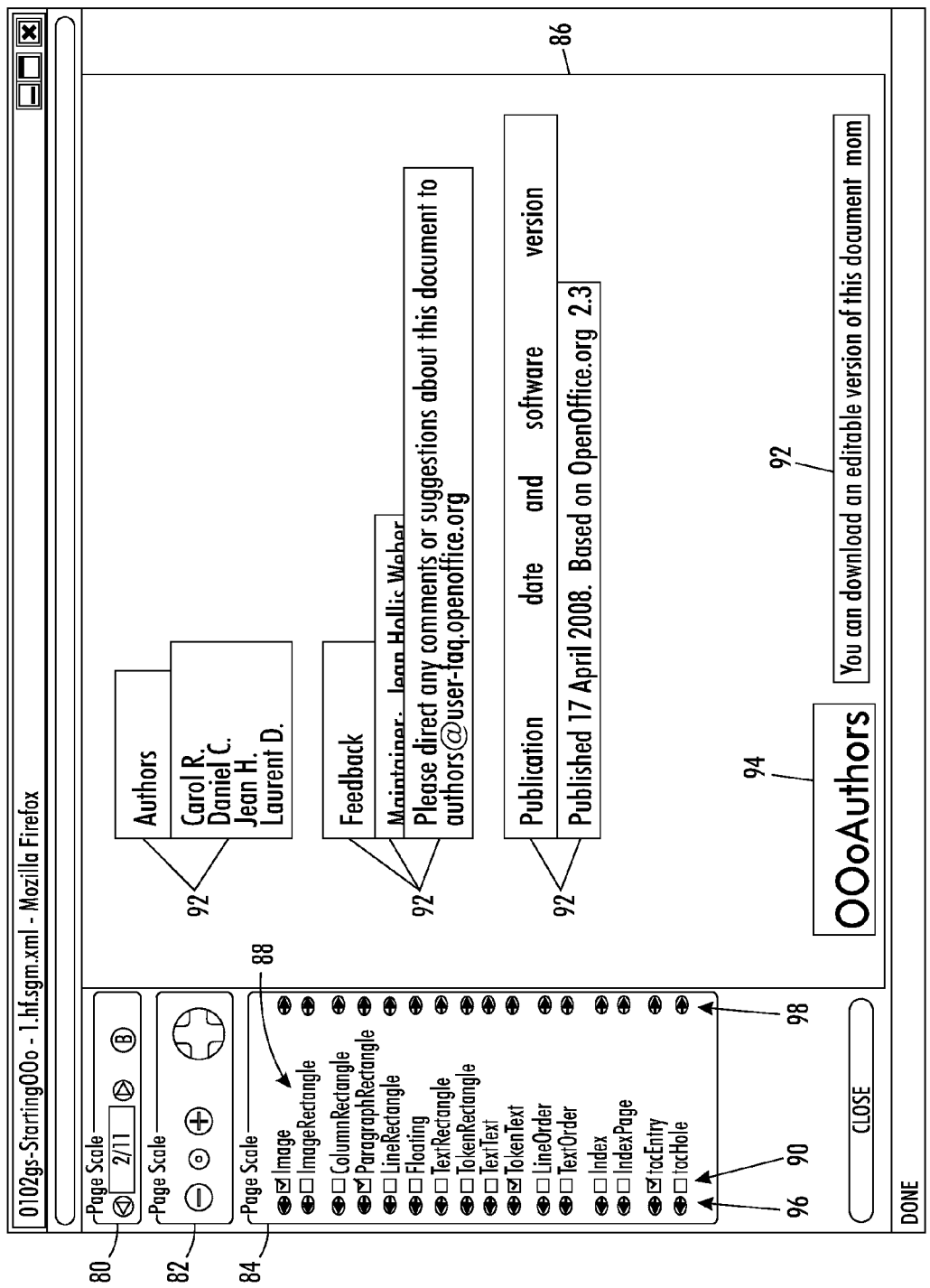
FIG. 7 is a screenshot illustrating transformation of a page of an XML document.

With reference now to FIG. 7, an interface for transformation of an input XML document, as displayed on a display screen to a user, is shown. The transformation interface includes a page navigation window 80, a page scale window 82, a decorations window 84, and an XML document display window 86. A feature of this embodiment is that the available decorations in the form of decoration names 88, e.g., as declared in the INI file, and including any default decorations, are listed. Beside each of the decoration names is a selection check box 90. Selecting, e.g., by clicking with a pointing device, one of the selection check boxes 90 toggles that selection to an alternate state, e.g., selected or non-selected, on or off, checked or unchecked, etc. In the exemplary embodiment shown, a check mark appears in the check boxes which are in a selected state. For instance, the user has elected check boxes named "Image", "ParagraphRectangle", "TokenText", and "tocEntry" to be in an on or selected state. Based on the selected ParagraphRectangle check box, each paragraph on a displayed XML page will be surrounded by a rectangle decoration 92, the design of which is either specified in the configuration file, or is a default rectangle design. However, in order for the text in the associated paragraphs to display, the user has also placed the TokenText check box in an "on" state, causing text (text tokens) to be displayed. Any images on the page, such as the OOo logo 94, are also displayed because of placement of the Image check box in an "on" state. If the page shown included a table of contents entry, it would also display because of the tocEntry check box being in a checked state. The selection check boxes 90 and the displayed decorations are dynamic. For example, if the user un-checks the ParagraphRectangle check box, the rectangle decorations 92 will disappear from the displayed view.

The decorations window 84 also has provision for decoration-selective XML document navigation. For instance, the decorations window 84 includes small navigation arrows 96, 98 to the left and right of each of the decoration names 88. In the embodiment shown, clicking on, or selecting, the right navigation arrow 98 beside the ParagraphRectangle decoration causes the visualizer to jump forward in the document to the next page that has such a paragraph decoration. In the case of a paragraph decoration, this would usually result in a jump only to the next page because each page normally has at least one paragraph. However, in the case of a more rarely occurring decoration, the jump may be multiple pages, thereby saving time for the user. The visualizer can be configured to handle navigation arrows 96, 98 associated with unchecked check boxes 90 in various ways. For example, in one embodiment, the navigation arrows 96, 98 may be grayed out and inactive when adjacent to an unchecked check box. In an alternate embodiment, however, selecting one of the navigation arrows 96, 98 associated with an unchecked check box may cause the associated check to automatically convert to the checked state. In yet another embodiment, conversion of a check box to a checked state may optionally be dependent on whether or not the XML document contains at least one occurrence of the associated type of decoration. Further, selection of one of navigation arrows 96, 98 or check boxes 90 may cause display of an information message indicating there are no occurrences of the particular decoration when such is the case. As an alternative, or in addition to the navigation arrows, the navigation links may be provided on the document 86, as in FIG. 6.

Figure 8:
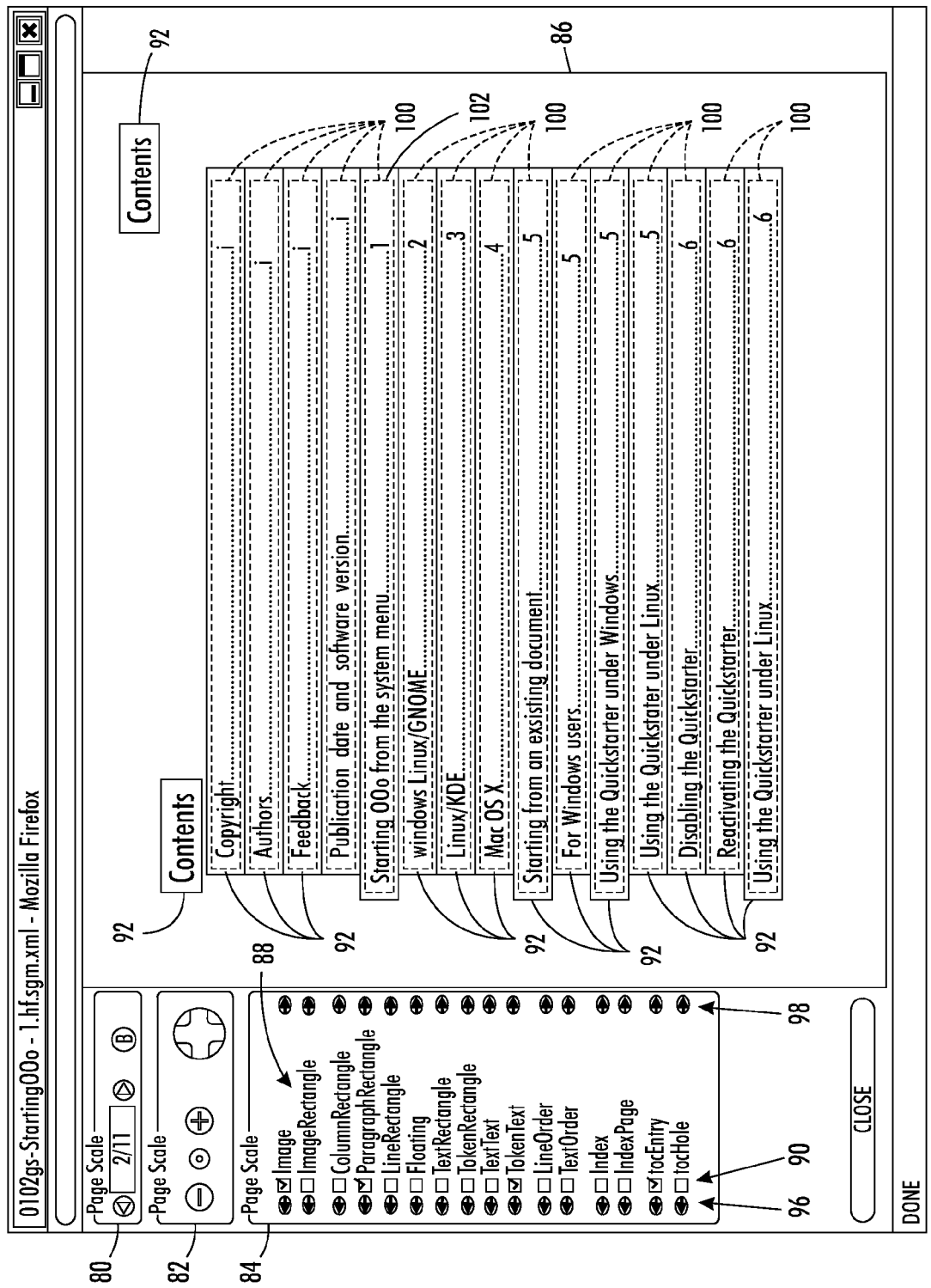
FIG. 8 is screenshot illustrating transformation of a second page of an XML document.

With reference now to FIG. 8, and continuing reference to FIG. 7, where like numerals represent like elements, the user has clicked on the forward navigation arrow 98 adjacent to the tocEntry (for the Table of Contents) decoration name 88 and the visualizer has consequently navigated to the next page in the XML document having a Table of Contents (TOC) entry. The TOC entries on the page, similar to the paragraph entries, are each decorated with a rectangle. However, the TOC entries are decorated with a dashed rectangle 102 whereas the paragraphs are decorated with a larger solid rectangle 92 as determined by declarations in the configuration/INI file. The user, instead, may have created or used a configuration wherein the paragraph and TOC decorations are decorated with rectangles of different colors, e.g., blue and green.

Figure 9:
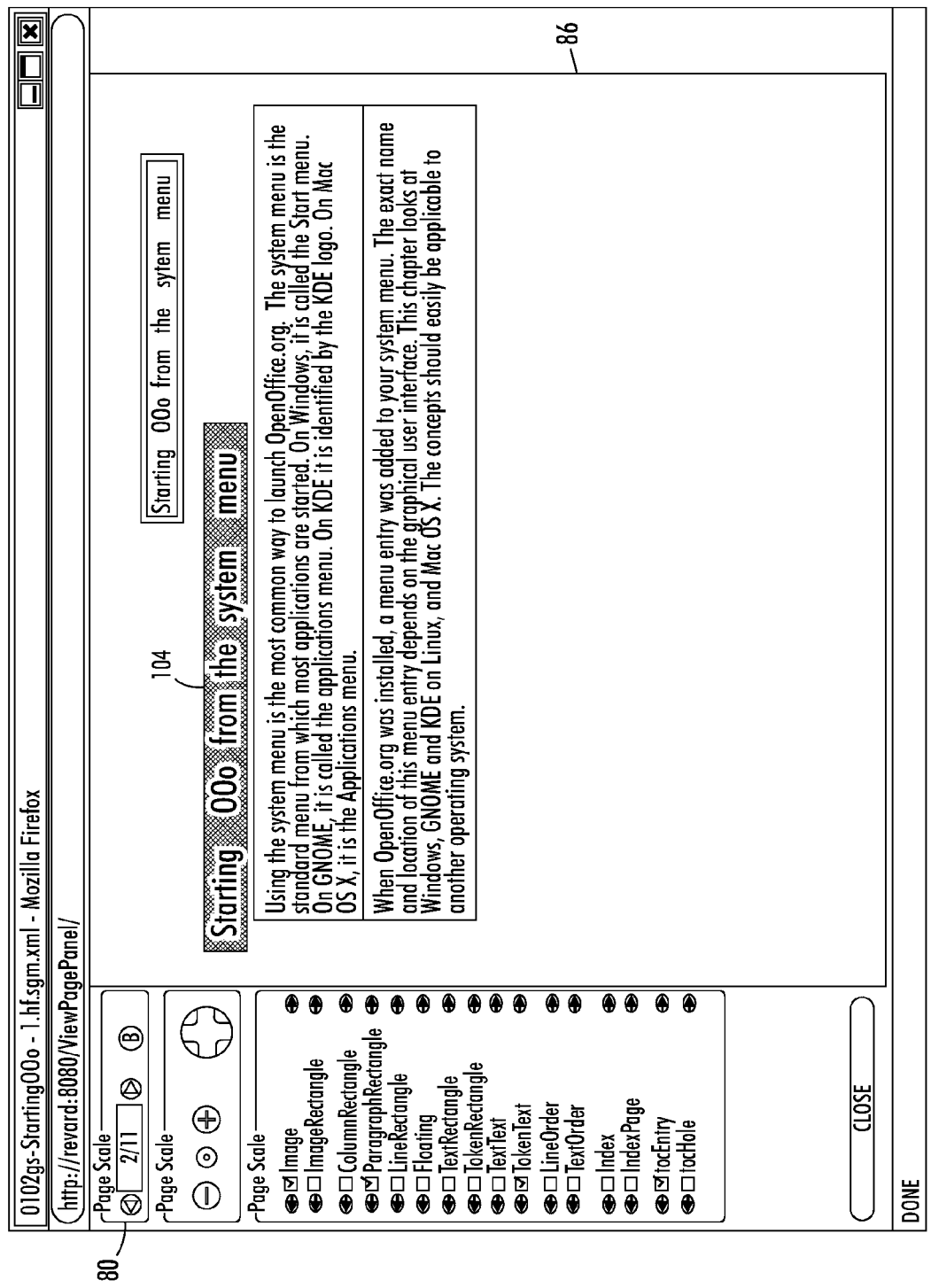
FIG. 9 is screenshot illustrating transformation of a third page of an XML document having a table of contents item.

With reference now to FIG. 9, and continuing reference to FIG. 8, another feature of navigation by decoration is described. The user has, e.g., clicked on the fifth tocEntry decoration 102 as shown in FIG. 8. The page navigation window 80 shows that the visualizer has jumped ahead to page 5/11 from page 2/11 and has highlighted the "Starting OOo from the system menu" text 104 which is a TOC entry. Note that the user has created or selected a configuration file which declares that TOC entries are decorated by highlighting. However, the user could have chosen an alternate type of decoration, such as a rectangle or other figure.

Run-Time Errors

Because the embodiments described herein evaluate XPath expressions dynamically, i.e., during processing of an XML input document, run-time errors may occur. Such an error at run-time can result in discarding of the display of a decoration. A feedback to the user is therefore desirable since the error would raise some sort of exception. Errors can arise from, for example: a selection XPath that returns something unexpected such as a numerical value rather than a nodeset (i.e., a list of XML document nodes); and, on the other hand, an XPath intended to return a numerical value returns something else, e.g., a nodeset or some string like "foo".

XPath Factorization

Since embodiments of the present application may evaluate many XPath expressions that may be similar to each other, the XPath factorization technique can be used to good advantage. For instance, once a node is selected for a decoration, if several parameters share the same start, e.g., ./parent:*/@x and ./parent:*/@y, an XPath factorization technique, as known in the art, can be of benefit with regard to processing speed. For example, an XPath expression for a blue rectangle decoration may select a series of nodes on a page. Then, taking each node in turn, a characteristic of the rectangle is computed for each node. Therefore, each characteristic is assigned to an XPath expression, and each of those XPath expressions is iterated. But, when evaluating those XPath expressions, an evaluation context is set, and the evaluation context will be the current XPath node. In XPath, an expression can be either an absolute or a relative expression. For nodes with a relative expression, the parent node is accessed for each parameter of the decoration, e.g., to calculate the width, height, color, etc. of the rectangle. So each XPath expression will start with a "./parent", and each parameter requires access to the parent. This requires many operations which, however, can be reduced or eliminated by the use of XPath factorization.

Alternatively, this type of optimization can be left to the user, for instance, by letting the user specify a XPath context, via some specific syntax, e.g.: XPath_x=./@x from ./parent:*. This syntax means that the XPath_x parameter can be evaluated using ./@x under the context node ./parent:*. In other words, ./parent:* means "the parent node, whatever its element name". The concept here is that if many parameters share the same context node expressed in a "from" clause, then the display engine can remember the result of the computation of ./parent:* so as to re-use it across parameters (reducing the number of XPath evaluations). Thus, when parsing the decoration definition, it becomes possible to reduce the number of XPath evaluations by putting shared contexts in a cache.

Exemplary Embodiment Flow Chart

Figure 10:
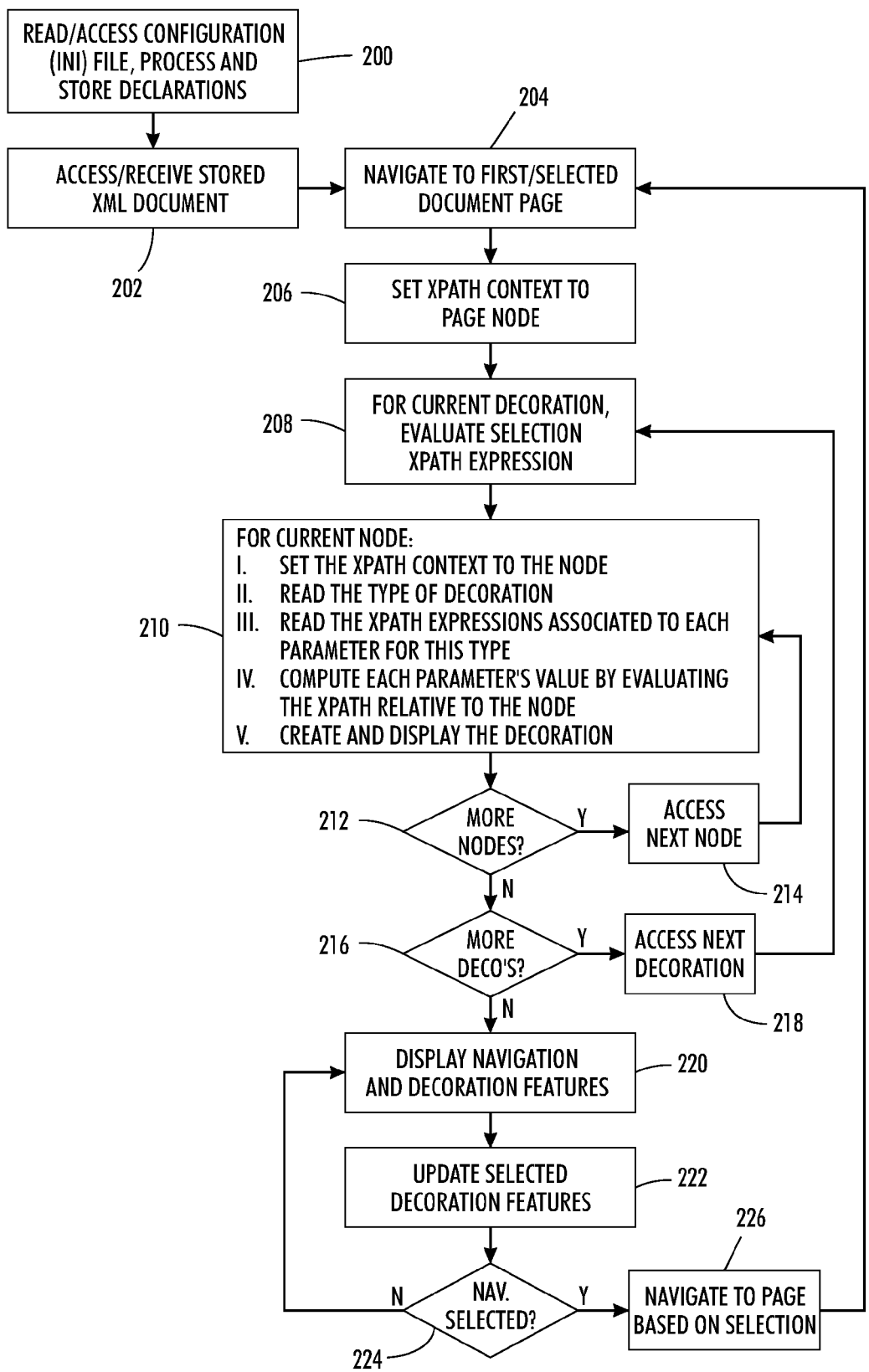
FIG. 10 is a flowchart summarizing a method of operation in accordance with embodiments of the present application.

With reference now to FIG. 10, an exemplary flowchart summarizing a method of operation of embodiments of the present application is provided. It is to be appreciated that the method has been previously described in detail, and a detailed description is not reiterated here.

A configuration file, e.g., an INI file is accessed, processed, and stored 200 in a system memory. Declarations in the configuration file control various navigation and display aspects of the visualizer as previously described. An XML document is accessed in memory, or received from a storage device or remote location 202 for processing and transformation by the visualizer.

Page navigation 204 is performed, navigating to either an initial page or a selected page, and the XPath context is set to the PAGE node 206. Iteration through the decorations declared in the configuration starts, and for the current decoration, a selection XPath expression is evaluated 208. As previously described with reference to FIG. 2, decoration node processing 210 occurs. The decoration processing includes setting the XPath context to the node, reading the type of decoration, reading the XPath expressions associated to each parameter for the type of node, computing each parameter's value by calculating each XPath expression relative to the node, and then creating and displaying the decoration on the display device.

After the decoration node processing 210, it is determined if additional nodes for the decoration exist 212, and if so, the next node is accessed 214, and decoration node processing is continued 210. If no more nodes for the decoration exist, it is determined if additional decorations exist 216, and if so, the next decoration is accessed 218, and evaluation is continued 208.

Features associated with the decorations such as, e.g., links 66, sibling relationship indicators 68, and nesting indicators 70 as shown in FIG. 6, or such as, e.g., navigation arrows 96, 98, selection check boxes 90, decoration names 88 as shown in FIG. 8, are displayed 220. In some embodiments, decoration selections can be dynamically updated, and provision is made here for updating the selected decoration features 222.

It is now determined if the user has selected an active navigation feature 224, and if so, navigation to a new page based on the user's selection is performed 226, and processing of the selected page occurs 204.

The method illustrated in FIG. 10 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

Apparatus for Implementing the Exemplary Method

Figure 11:
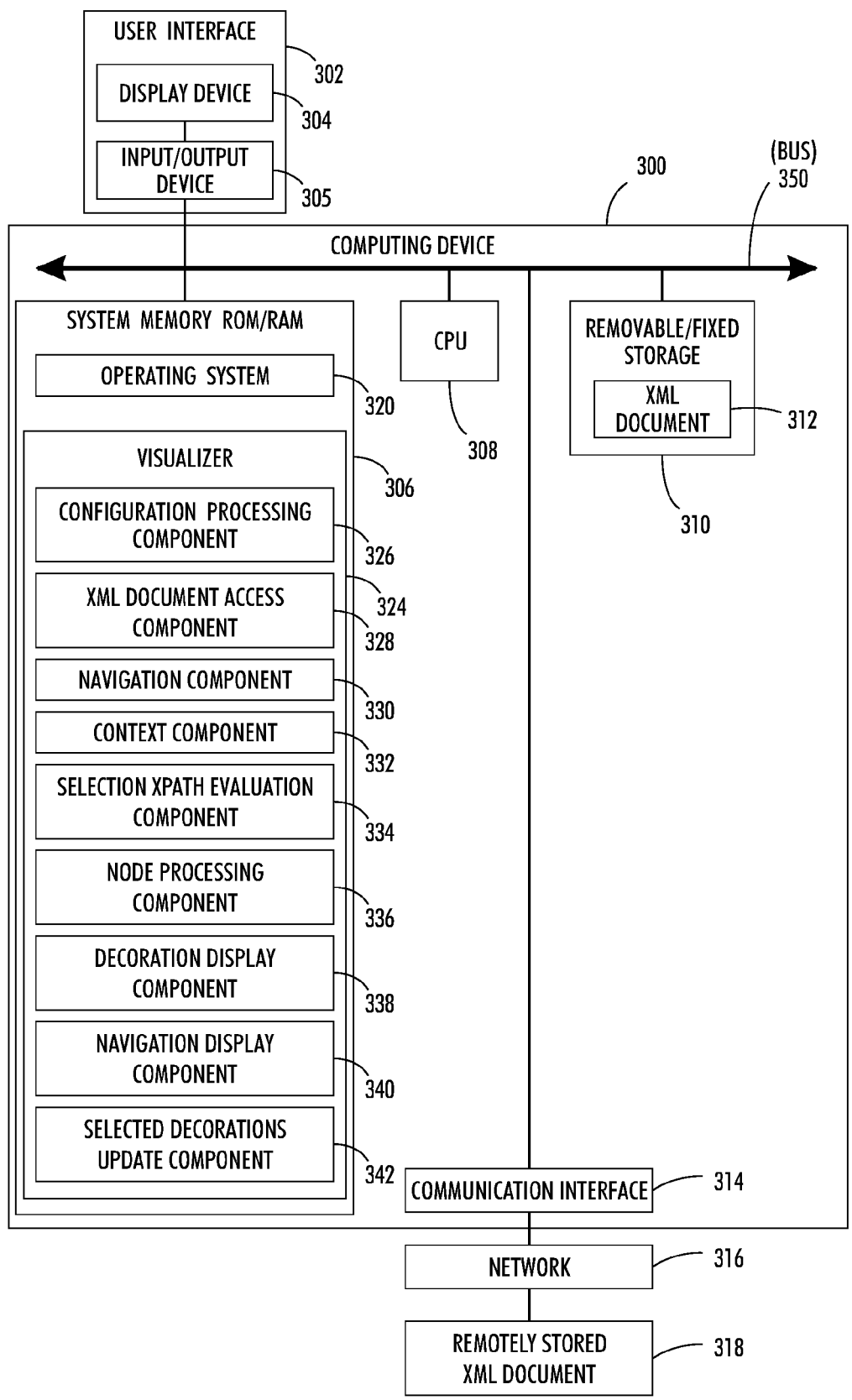
FIG. 11 is a functional block diagram of a computing device suitable for implementing aspects of the exemplary method.

With reference now to FIG. 11, an exemplary computing device 300 suitable for implementing aspects of the present application is shown. The computing device 300 may include a processor 308 and system memory 306 accessible to the processor. The processor may be, e.g., a central processing unit (CPU), a micro-controller unit (MCU), digital signal processor (DSP), or the like. The system memory 306 may include, e.g., read only memory (ROM), random access memory (RAM), and/or memory with other access options. The computing device 300 may also include memory storage 310 such as computer readable media, including, e.g., magnetic media, such as a hard disk, a floppy disk, or other magnetic disk, a tape, a cassette tape, optical media, such as optical disk (CD-ROM, DVD), semiconductor media, such as DRAM, SRAM, EPROM, EEPROM, or memory stick. Further, portions of memory storage 310 may be removable or non-removable.

The computing device 300 may also include: a user interface 302 comprising, e.g., a display device 304 such as a liquid crystal display, plasma display, or cathode ray tube display; and an input/output device 305 such as a keyboard, pointing device, microphone, and speakers, or combination thereof. The computing device 300 may also include one or more communication interfaces 314 for communicating with, e.g., peripheral devices such as input/output devices, including scanners and printers, or for communicating with other computing systems via a wired or wireless network 316 whereby a remotely stored XML document 318 may be input and stored. The system memory 306 may store and support modules, for example, an operating system (OS) 320 and embodiments of the visualizer 324.

A visualizer 324 includes components necessary for operation of the visualizer as previously described to perform the method for transforming digitally stored XML documents to an enhanced visualization on the display device 304, with selected decorations and navigation features as previously described. Because each of these components operates as previously described with reference to FIG. 10 and elsewhere, a detailed description is not reiterated again. The visualizer may be embodied in hardware or software or a combination thereof. In the exemplary embodiment, the visualizer takes the form of instructions stored in memory 306 for implementing the exemplary method when executed by processor 308. Further, the visualizer 324 and its components 326-342 may be stored on and accessed from the computer readable media. The visualizer 324 and its components 326-342 may also be accessed or retrieved from other computing systems and/or storage systems via the communication interface 314. Included in the visualizer 324 are a configuration file (e.g., INI file) processing component 326 and an XML document access component 328. The configuration file processing component 326 accesses, processes, and stores the configuration files in the memory 306 for controlling operation of various navigation and display aspects of the visualizer. The XML document access component 328 may receive a digitally stored XML document 312, stored in the memory 310 of the computing device 300, or it may receive the XML document via the network 316 when it is stored remotely on another system.

The visualizer 324 also includes a document navigation component 330, a context determining and evaluation component 332, a selection XPath evaluation component 334, a node processing component 336, a decoration display component 338, a navigation aid display component 340, and a component to update which decorations are currently selected 342. Components of the computing device may communicate via a bus 350. The navigation component 330 is utilized by the visualizer for navigating either to an initial page or a user-selected page of the document. The context determining and evaluation component 332 is utilized by the visualizer during navigation and computation of parameters. For example, on navigation to a page, the XPath context is set to the PAGE node, and when evaluating expressions associated with a particular node, the XPath context is set to that node. The selection XPath evaluation component 334 selects, for a certain page, all the XML nodes subject to the current decoration. The node processing component 336 controls processing related to a currently selected node as previously described with reference to the node procedure 40 in FIG. 2. The decoration display component 338 and the navigation aid display component 340 implement and control display and/or printing of the user-selected decorations and the navigation decorations as previously described.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A computer-implemented method for transforming a markup language document from a digital form to a displayed form on a display device, said method comprising:
   accessing stored decoration declarations, each declaration associated with at least one type of markup language document node, each declaration including:
      decoration parameters specifying the decoration type; and
      at least one selection language expression identifying the markup language document node type;
   receiving a digital markup language document;
   displaying at least a portion of the document content with nodes decorated as specified in at least a selected one of the stored decoration declarations;
   providing for selecting by a user, one of the displayed markup language decorations;
   providing for selecting by the user, a navigation direction; and
   navigating by the computer to either a prior page in the markup language document or a following page in the markup language document based on the selected navigation direction, wherein the navigated-to page includes at least one markup language node corresponding to the decoration type of the markup language decoration selected by the user.

2. The method according to claim 1, the method further comprising:
   navigating to a page in the markup language document; and
   for the current navigated-to page in the markup language document, setting a context to a page node, and performing a page transformation by the computer, the page transformation comprising:
      for one of the decoration declarations, evaluating the selection language expression;
      for a markup language node in the navigated-to page, performing a node transformation, the node transformation comprising:
         setting the context to the markup language node;
         determining the type of decoration associated with the current context;
         reading the selection language expressions associated with each declaration whose declaration type matches the current determined type of decoration;
         computing a decoration parameter value for each of the decoration parameters associated with each declaration whose declaration type matchers the current determined type of decoration;
         creating and displaying on a display device, a display markup language decoration based on the computed decoration parameter values, in addition to previously displayed decorations; and
         repeating the setting the context to the markup language node, the determining the type of decoration; the reading the selection language expressions, the computing the decoration parameter values, and the creating and displaying, for each remaining markup language node in the navigated-to page; and
      repeating the evaluating the selection language expression, and the performing a node transformation for each remaining decoration declaration.

3. The method according to claim 1, wherein:
   the selection language comprises an XPath language; and
   the markup language comprises an XML language.

4. The method according to claim 1, further comprising storing parameters for each of a plurality of user selectable decorations.

5. The method according to claim 1, wherein the decorations are stored as INI files.

6. A computer program product comprising a non-transitory storage medium encoding instructions which, when executed by a computer, perform the method of claim 1.

7. The computer program product of claim 6, wherein:
   the selection language comprises an XPath language; and
   the markup language comprises an XML language.

8. A computer-implemented method for transforming a markup language document from a digital form to a displayed form on a display device, the method comprising:
   accessing stored decoration declarations, each declaration associated with at least one type of markup language document node, each declaration including:
      decoration parameters specifying the decoration type; and
      at least one selection language expression identifying the markup language document node type;
   receiving a digital markup language document;
   displaying on the display device, by the computer, a plurality of decoration options, each decoration option having an on state and an off state, each decoration option corresponding to a markup language node type, wherein the on state indicates that markup language decorations corresponding to the markup language node type corresponding to the displayed decoration option are to be displayed on the display device, and wherein the off state indicates that markup language decorations corresponding to the markup language node type corresponding to the displayed decoration option are not to be displayed on the display device; and
   displaying at least a portion of the document content with nodes decorated as specified in at least a selected one of the stored decoration declarations.

9. The method according to claim 8, further comprising:
   displaying on the display device, by the computer, a forward navigation indicator and a reverse navigation indicator for each of a plurality of displayed decoration options, wherein a user is able to select a navigation direction comprising selecting one of the forward navigation indicators for navigating to a following page or selecting one of the reverse direction indicators for navigation to a prior page.

10. The method according to claim 8, further comprising:
    dynamically updating at least one of the displayed decoration options when a user selects a decoration option; and
    wherein the computer dynamically updates the displayed markup language decorations based on the updated decoration option.

11. The method according to claim 10, further comprising:
    dynamically changing the state of a displayed decoration option to an on state when the user selects one of the displayed navigation decorations.

12. A computer-implemented method for transforming a markup language document from a digital form to a displayed form on a display device, the method comprising:
- accessing stored decoration declarations each declaration associated with at least one type of markup language document node, each declaration including:
  - decoration parameters specifying the decoration type, at least one of the decorations comprising a bounding box; and
  - at least one selection language expression identifying the markup language document node type, the selection language expression identifying at least one of a paragraph, a token, a column, and a TOC entry to be bounded by the bounding box;
- receiving a digital markup language document; and
- displaying at least a portion of the document content with nodes decorated as specified in at least a selected one of the stored decoration declarations.

13. The method according to claim 12, further comprising:
- providing for selecting by a user, one of the displayed markup language decorations;
- providing for selecting by the user, a navigation direction; and
- navigating by the computer to either a prior page in the markup language document or a following page in the markup language document based on the selected navigation direction, wherein the navigated-to page includes at least one markup language node corresponding to the decoration type of the markup language decoration selected by the user.

14. The method according to claim 12, further comprising:
- displaying on the display device, by the computer, at least one navigation decoration for each displayed markup language decoration;
- providing for selecting by a user, one of the displayed navigation decorations;
- when a navigation direction is selected by the user, navigating by the computer to either a prior page in the markup language document or a following page in the markup language document based on the selected navigation direction, wherein the navigated-to page includes at least one markup language node corresponding to the decoration type of the markup language decoration corresponding to the navigation decoration selected by the user.

15. A computer-implemented method, wherein for transforming a markup language document from a digital form to a displayed form on a display device, the method comprising:
- accessing stored decoration declarations, each declaration associated with at least one type of markup language document node, each declaration including:
  - decoration parameters specifying the decoration type; and
  - at least one selection language expression identifying the markup language document node type;
- receiving a digital markup language document; and
- displaying at least a portion of the document content with nodes decorated with decorations as specified in at least a selected one of the stored decoration declarations, wherein at least one of the decorations is a floating window which displays underlying markup language content associated with the node type.

16. A computer-implemented method for transforming a markup language document from a digital form to a displayed form on a display device, the method comprising:
- accessing stored decoration declarations, each declaration associated with at least one type of markup language document node, each declaration including:
  - decoration parameters specifying the decoration type; and
  - at least one selection language expression identifying the markup language document node type;
- receiving a digital markup language document; and
- displaying at least a portion of the document content with nodes decorated with decorations as specified in at least a selected one of the stored decoration declarations, at least one of the decorations comprises a navigation link, which when activated by a user, navigates to another page having the same node type.

17. A computer-implemented method for transforming a markup language document from a digital form to a displayed form on a display device, the method comprising:
- accessing stored decoration declarations, each declaration associated with at least one type of markup language document node, each declaration including:
  - decoration parameters specifying the decoration type; and
  - at least one selection language expression identifying the markup language document node type;
- receiving a digital markup language document;
- displaying at least a portion of the document content with nodes decorated as specified in at least a selected one of the stored decoration declarations;
- the method further comprising at least one of:
  - providing for modifying by a user, at least one of the stored decoration declarations; and
  - providing for defining by the user, user-defined decoration declarations.

18. A computer program product comprising a non-transitory storage medium encoding instructions which, when executed by a computer, perform the method of claim 17.

19. A computing device for transforming a markup language document from a digital form to a displayed form on a display device, the computing device comprising:
- a visualizer program stored in a system memory, the visualizer program comprising:
  - a configuration processing component;
  - a markup language document access component;
  - a decoration display component; and
  - a navigation component for navigating to either a prior page in the markup language document or a following page in the markup language document based on a navigation direction selected by a user;
- a processor for controlling operation of the visualizer program;
- wherein the visualizer program, when stored in the system memory, is configured to perform a markup language transformation process, the markup language transformation process comprising:
  - accessing, by the configuration processing component, stored decoration declarations, each declaration associated with at least one type of markup language document node, each declaration including:
    - decoration parameters specifying the decoration type; and
    - at least one selection language expression identifying the markup language document node;
  - receiving a digital markup language document by the markup language document access component; and
  - displaying, by the decoration display component, at least a portion of the document content with nodes decorated as specified in the stored decoration declarations.

20. The computing device of claim 2, wherein the navigation component causes the display device to display at least one navigation decoration for each displayed markup language decoration, whereby when the user selects one of the displayed navigation directions, the navigation component navigates to either a prior page in the markup language document or a following page in the markup language document based on the selected navigation direction, wherein the navigated-to page includes at least one markup language node corresponding to the decoration type of the markup language decoration corresponding to the navigation decoration selected by the user.

21. The computing device of claim 19, wherein the decoration display component is configured for causing the display to display, a plurality of decoration options, each decoration option having either an on state or an off state, each decoration option corresponding to a markup language node type, wherein the on state indicates that markup language decorations corresponding to the markup language node type corresponding to the displayed decoration option are to be displayed on the display device, and wherein the off state indicates that markup language decorations corresponding to the markup language node type corresponding to the displayed decoration option are not to be displayed on the display device.

22. The computing device of claim 21, wherein the decoration display component is configured for dynamically updating at least one of the displayed decoration options, wherein when a user selects the decoration option and changes the decoration option from an on state to an off state or from an off state to an on state, the decoration display component being configured for dynamically updating the displayed markup language decorations based on the updated decoration option.

23. The computing device of claim 22, wherein the decoration display component is configured for dynamically changing the state of a displayed decoration option to an on state when the user selects one of the displayed navigation decorations.

24. The computing device of claim 19, further comprising a display device in communication with the visualizer which displays a decorated document.

25. The computing device of claim 19, wherein the visualizer further comprises a context component, which, for a current navigated-to page in the markup language document, sets a context to a page node, which causes the visualizer to perform a page transformation, the page transformation comprising:

for one of the decoration declarations, evaluating, by the selection markup language evaluation component, the selection language expression;

for a markup language node in the navigated-to page, performing a node transformation by the visualizer, the node transformation comprising:

setting the context to the markup language node by the context component;

determining the type of decoration associated with the current context by the visualizer;

reading the selection language expressions associated with each declaration whose declaration type matchers the current determined type of decoration by the visualizer;

computing, by the visualizer, a decoration parameter value for each of the decoration parameters associated with each declaration whose declaration type matchers the current determined type of decoration;

creating and displaying on a display device by the decoration display component, a display markup language decoration based on the computed decoration parameter values, in addition to previously displayed decorations; and repeating the setting the context to the markup language node, the determining the type of decoration; the reading the selection language expressions, the computing the decoration parameter values, and the creating and displaying, for each remaining markup language node in the navigated-to page; and repeating the evaluating the selection language expression, and the performing a node transformation for each remaining decoration declaration.

* * * * *